United States Patent [19]

Steagall et al.

[11] Patent Number: 5,359,598
[45] Date of Patent: Oct. 25, 1994

[54] VOICE SERVER FOR DIGITAL COMMUNICATION NETWORK

[75] Inventors: Robert W. Steagall, North Salt Lake; Steven T. Barham, Salt Lake City; John W. Love, Bountiful, all of Utah

[73] Assignee: Unisys Corporation, Blue Bell, Pa.

[21] Appl. No.: 77,887

[22] Filed: Jun. 15, 1993

Related U.S. Application Data

[63] Continuation of Ser. No. 991,473, Dec. 16, 1992, abandoned, which is a continuation of Ser. No. 542,066, Jun. 22, 1990, abandoned.

[51] Int. Cl.$^5$ .............. H04Q 11/04; H04J 3/12; H04M 1/00
[52] U.S. Cl. ................. 370/58.1; 370/60; 370/68.1; 370/110.2; 379/269; 379/353; 379/361; 379/375
[58] Field of Search ........... 379/352, 353, 361, 373, 379/375, 377, 386, 387, 397, 399, 481, 419, 269, 209, 93, 94; 370/53, 58.1-58.3, 68.1, 80, 60, 60.1, 62, 85.1, 85.5, 85.12, 85.15, 124, 94.1, 94.2, 94.3, 110.1, 110.2, 110.3, 110.4; 371/32

[56] References Cited

U.S. PATENT DOCUMENTS

| | | | |
|---|---|---|---|
| 3,899,642 | 8/1975 | Jones et al. | 370/110.1 |
| 4,107,477 | 8/1978 | Morrison | 379/164 |
| 4,281,410 | 7/1981 | Agricola et al. | 370/110.1 |
| 4,450,554 | 5/1984 | Steensma et al. | 370/80 |
| 4,538,259 | 8/1985 | Moore | 370/94.1 |
| 4,630,262 | 12/1986 | Callens et al. | 370/94.1 |
| 4,646,296 | 2/1987 | Bartholet et al. | 370/124 |
| 4,697,263 | 9/1987 | Beaufoy | 370/85.1 |
| 4,698,841 | 10/1987 | Haselton et al. | 370/94.3 |
| 4,706,244 | 11/1987 | Watson et al. | 370/69.1 |
| 4,726,019 | 2/1988 | Adelman et al. | 370/94.1 |
| 4,748,656 | 5/1988 | Gibbs et al. | 370/93 |
| 4,757,496 | 7/1988 | Bartholet et al. | 370/95.1 |
| 4,817,086 | 3/1989 | Oye et al. | 370/85.1 |

*Primary Examiner*—Douglas W. Olms
*Assistant Examiner*—Hassan Kizou
*Attorney, Agent, or Firm*—Whitman, Curtis & Whitham

[57] ABSTRACT

An interface for coupling a standard telephone set to a distributed digital network for allowing digital voice communication over the distributed network such that the utilization of the distributed network is wholly transparent to the user. An interface is provided for each telephone set. Each interface includes a state machine, a coder/decoder and a digital tone generator. The state machine is responsive to analog control signals from the telephone set to generate digital control signals to be transmitted over the distributed network. The state machine is also responsive to digital control signals to control the digital waveform generator to generate supervisory tones which are relayed to the user by the telephone set. The state machine also monitors the operation of the corresponding state machine or machines in a normal or conference call and sends control signals to resolve inconsistent states of the respective state machines, resulting in a high degree of fault tolerance and independence from network protocols.

7 Claims, 7 Drawing Sheets

| TELEPHONE #1 | STATE MACHINE #1 FUNCTION | STATE MACHINE #2 FUNCTION | TELEPHONE #2 |
|---|---|---|---|
| HANDSET IS PICKED UP | ——→ DETECT OFF-HOOK GENERATE | | |
| { TONE } | ——— DIAL TONE | | |
| BUTTON OF 1st # PRESSED | ——→ DISCONTINUE DIAL TONE STORE 1st #, | | |
| BUTTON OF 2nd # PRESSED | ——→ STORE 2nd #, | | |
| ⋮ | ⋮ | | |
| BUTTON OF LAST # PRESSED | ——→ STORE LAST #, TRANSLATE PHONE # AS AN ADDRESS ON NETWORK, SEND MESSAGE (TO STATION #2) TO ESTABLISH VIRTUAL CONNECTION ("RING" PACKET, FIG.3 ) | ——→ RECEIVE "RING" PKT., SEND RING SIGNAL IF PHONE #2 NOT BUSY, | ——— RING BELL |
| | | SEND "BUSY" PKT. OR | |
| { "RING BACK" "BUSY" TONE AT EARPHONE } | ←——— RECEIVE "RING BACK" PKT. GENERATE "RING" OR "BUSY" TONE | ←——— "RING BACK" PKT. TO #1, | |

VOICE SERVER FOR DIGITAL COMMUNICATION NETWORK

This application is a continuation of U.S. patent application Ser. No. 07/991,473, filed Dec. 16, 1992, abandoned, which is a continuation of U.S. patent application Ser. No. 07/542,066, filed Jun. 22, 1990, abandoned.

CROSS-REFERENCE TO RELATED APPLICATIONS

This application is related to U.S. patent application Ser. No. 07/544,144, CONFERENCE CALL ARRANGEMENT FOR DISTRIBUTED NETWORK, by Robert W. Steagall, Steven T. Barham and Michael Hurst, filed concurrently herewith, U.S. Pat. No. 5,127,001.

BACKGROUND OF THE INVENTION

1. Field of the Invention

This invention relates to voice communications over distributed digital networks (e.g. networks which do not have a central station) such as local area networks and, more particularly, to interfaces between such distributed digital networks and analog devices such as telephone sets.

2. Description of the Prior Art

Telephonic communications have been well known and in widespread use for many years. The interconnection arrangements which allow selective connection of telephone sets is complex and has developed from manually operated switchboards to elaborate central switching systems now in commercial use. The use of telephonic communication is central to the efficient operation of many offices, laboratories, businesses and the like. Further developments in other fields have also been adapted for use with telephonic communications systems, permitting communication of data other than voice over the telephone system, such as facsimile messages and data originating in digital form in data processing equipment. More recently, telephonic communication systems have begun adopting digital transmission techniques allowing improved noise immunity and greater data density on the existing communication links. The use of optical fibers for the communication link is also an excellent medium for transmission of numerous digital signals representing acoustic or voice signals. However, use of commercial digital voice transmission systems has generally been limited to long distance communications and analog to digital conversion is done at a central office which interfaces with the long distance links. Therefore the analog connection from the subscriber telephone set to the central station remains subject to noise and interference problems.

Similarly, development of data processing equipment has resulted in the use of local, wide and global area networks for transmission of digital data between data processing systems and which will be collectively referred to herein as distributed digital networks, allowing more rapid transmission than is possible over analog telecommunication links using modulator/demodulator devices (Modems) to convert digital signals into audio frequency tones for transmission. These distributed digital networks are also distinguished from telecommunication networks by the fact that they do not have a central station. Thus control of the network, as would otherwise be exerted by a central station, is "distributed".

A distributed digital network has several inherent advantages over a telecommunication network having a central station. Most importantly, a distributed digital network will have no single point of failure and communications may continue between functional stations even when one or more of the stations is non-functional. Further, the distributed digital network can be arranged to enhance security and reliability of communications between stations on the network, such as by encryption or the increase of resistance to interference. A distributed digital network need not be limited to subscriber stations on the network since inter-network or gateway interfaces can be provided to allow connection of the distributed digital network to another network, such as a commercial network.

Distributed network systems having digital protocols are known which include arrangements for communication by devices other than data processing equipment such as facsimile equipment, bulk storage devices, data bases, acoustic couplers, printers, mainframe access units and digital telephones. U.S. Pat. No. 4,697,263 to Beaufoy is exemplary of such arrangements. However, as disclosed therein, since there is no common equipment on such a network, each device connected to the network must contain its own clock and complex synchronization schemes are necessary to permit reliable transmission and reception of data. Such systems also require compatibility between equipment connected to the network, even though interfaces are used which may be particularized to the equipment and, as disclosed in the above noted patent, "dedicated special purpose stations" are required for special functions such as telephone conferencing, short code dialling, external connection to other communication networks, voice recording, network usage accounting and protocol conversion.

With regard to voice communication over the system of Beaufoy, the generation of call progress tones or so-called supervisory tones to indicate call status presents a substantial burden and it is indicated to be preferable that a display be substituted to avoid the need to produce such tones. If such supervisory tones are required, it is suggested that they may be generated by the microprocessor which also must control the time slot processor and which is subject to interrupts by the time slot processor. As disclosed therein, the time slot processor monitors each time slot and generates an interrupt signal upon a match of the address portion of a data packet with the station address.

Nevertheless, the use of supervisory tones is well established in the telecommunications art and is heavily relied upon by users in operating telephone equipment in a manner which has come to be natural to such users. Therefore, it is extremely desirable that the communication over a digital network without a central switching facility, which would otherwise generate such supervisory tones, be entirely transparent to the user. It is also important to provide an arrangement allowing call forwarding and conference calling in a manner which is similarly transparent to the user. Moreover, since the use of supervisory tones has been such a long standing convention in the telecommunication system art, other devices which are capable of communicating at audio frequencies over the phone lines will often use some supervisory tones for control functions. Therefore, a digital network which is transparent to the user eliminates the need for specialized equipment. For instance, standard telephone sets, which term as used herein includes telephone sets adapted to be used by the handicapped (where the existence of, say, a dial tone or busy signal may be displayed to the user visually or tactilely), acoustically coupled modems, answering machines, encryption devices, facsimile machines and the like which are usable with commercial telecommunications networks, could also be used with such a system in accordance with the invention.

By the same token, it is desirable that there be no requirement that interface to the network be particularized to the network on which the voice communication is provided and that additional synchronization problems, beyond those already provided for in the network itself, be minimized or eliminated altogether. Specifically, it is desirable that the voice transmission capability not cause additional constraints on the network design or operation or require particular circuitry which is adapted for a particular network. It is particularly desirable in this regard that a voice communication arrangement for communicating over a distributed digital network, such as a local area network, be at least as, if not more, fault tolerant than the digital data processing devices which the network was originally designed to serve.

SUMMARY OF THE INVENTION

It is therefore an object of the present invention to provide a system enabling high-quality voice transmission over a distributed digital network in which the use of a distributed digital network is entirely transparent to a user.

It is a further object of the invention to provide a system enabling high-quality voice communication in which communications occur point-to-point, making system reliability independent of faults at any particular subscriber station.

It is an additional object of the invention to provide a voice communication system in which audible signals are digitized at the point of origin, reducing system susceptibility to noise.

It is another further object of the invention to provide an interface with a distributed digital network which permits connection of standard telephone sets and accommodates full functionality of features provided therein without the requirement of hardware changes in the interface or the imposition of constraints on the distributed digital network.

It is a yet further object of the invention to provide fault tolerance in voice communication capability in a distributed digital network.

In order to achieve the foregoing objects of the invention, an interface and a distributed network system including such interface has been provided wherein the interface, or voice server includes a state machine responsive to control signals from a standard telephone set for generating digital control signals suitable for transmission on a distributed digital communication link and also responsive to digital control signals on the digital communication link for controlling coupling of a telephone set to the distributed communication link, a coder/decoder means for coding analog signals from said telephone set into digital signal packets and decoding digital signal packets from said digital communication link into signals representing analog signals to be reproduced by the telephone set, and digital waveform generator responsive to the state machine for generating a waveform causing production of tones indicative of the status of connection of said telephone set to said digital communication link.

In accordance with one aspect of the invention, a distributed digital network is provided including at least two telephone sets, each telephone set having a state machine responsive to control signals from the telephone set for generating digital control signal packets suitable for transmission on a distributed digital communication link and responsive to digital control signal packets on said digital communication link for controlling coupling of a telephone set to the digital communication link and a signal generator responsive to the state machine for generating at least one signal representing an analog signal corresponding to at least one digital control signal packets, the telephone set having a device responsive to the signal representative of an analog signal for communicating the existence of the signal representative of an analog signal to an operator of the telephone set.

In accordance with another aspect of the invention, a state machine is provided in an interface between a telephone set and a distributed digital network which is responsive to a call signal received over the distributed digital network to control ringing of the associated telephone set if the associated telephone set is not in an off-hook condition and to acknowledge said call signal with a code representing at least one of an off-hook condition and a ringing condition, responsive to a code representing an off-hook condition, subsequent to transmission of a call signal, to control generation of a tone representing an off-hook condition to the associated telephone set and responsive to another code representing a ringing condition, subsequent to transmission of a call signal, to control generation of a tone representing such ringing condition to the associated telephone set.

In accordance with yet another aspect of the invention, a state machine is provided for use in an interface between a telephone set having a keypad and a distributed digital network which is responsive to the beginning of an off-hook in an idle state to control generation of a dial tone at the associated telephone set and to initiate a keypad state and responsive to actuation of a key of the keypad while in said keypad state to store data represented by the actuated key and to control generation of a tone at the associated telephone set corresponding to the actuated key.

In accordance with a further aspect of the invention, a state machine is provided for use in an interface between a telephone set and a distributed digital network wherein the state machine has a predetermined sequence of permissible states when a call is in progress between a telephone set associated with the state machine and another telephone set, and wherein the state machine is responsive to a control signal from said distributed digital network commanding a change of state from its present state to a state which is not next among the predetermined sequence of states to control retransmission of the command previously caused to be transmitted by the state machine.

The provision of a state machine responsive to control signals from both the local telephone set and the distributed digital network is thus able to control local generation of supervisory tones, resolve conflicting status signals from other state machines and ensure high-quality, reliable and transparent operation of a voice link over a distributed digital network independent of the extent, synchronization and communication protocols of that distributed digital network. No greater constraint is placed on the network than the requirement that the network must have sufficient capacity to carry enough packets to convey voice. In accordance with current standards, this capacity would be approximately 128K bits per second or, with data compression, as few as 1.6K bits per second. It should also be noted that delays used by the system are user defined delays and network delays can be accommodated by appropriate definition of system delays by the user so that network delays do not cause time-outs causing the state machine to erroneously alter states. Therefore, the invention is applicable to virtually any digital network of sufficient capacity to carry a voice signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
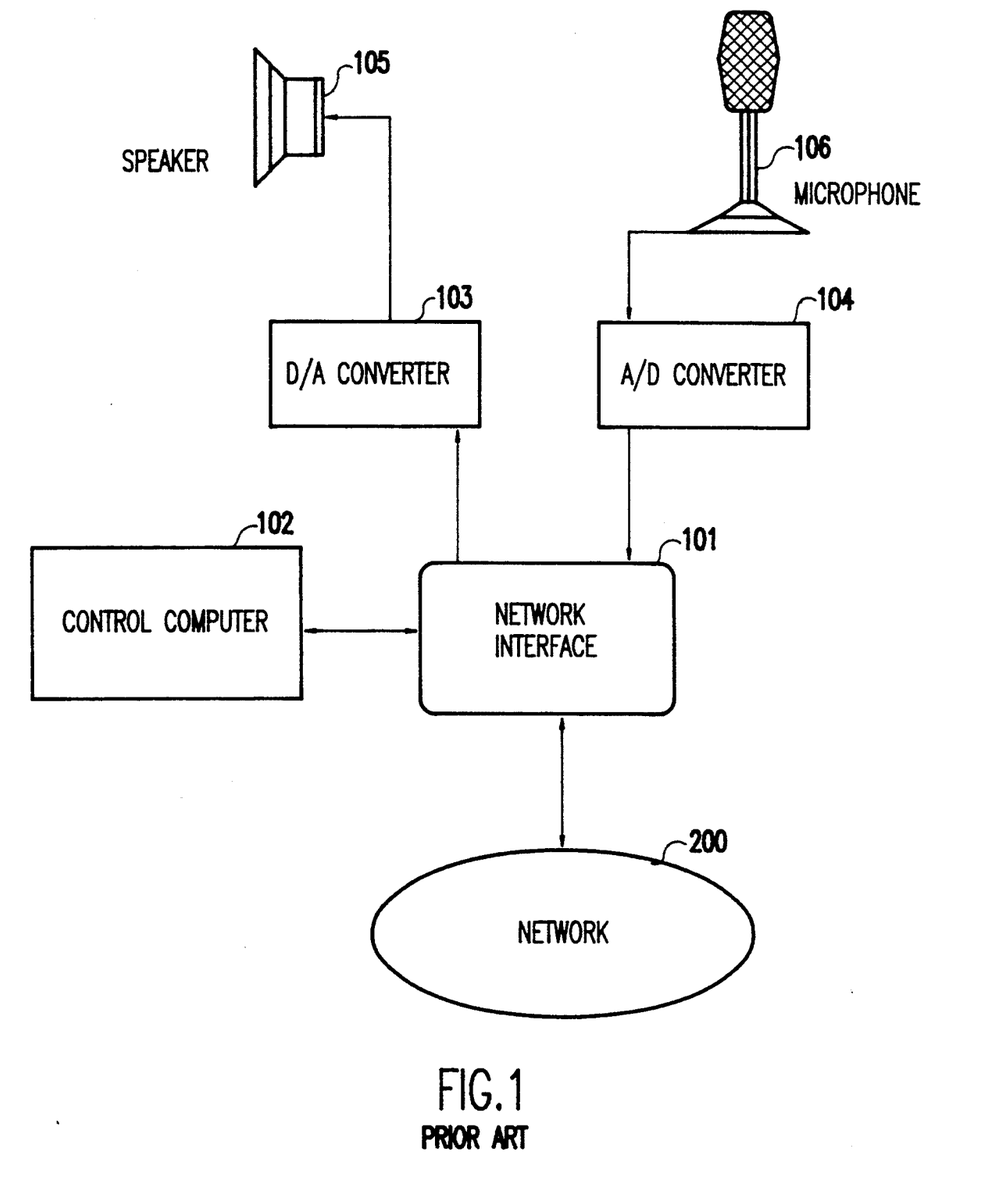
FIG. 1 is a block diagram of a conventional arrangement for providing voice communication over a local area network.

Referring now to the drawings, and more particularly to FIG. 1, there is shown a block diagram of a conventional interface arrangement for providing voice communication on a local area network. In this arrangement, a network interface 101 is provided which is controlled by control computer 102 which, can be implemented in a variety of forms. This control computer 102 also controls transmission of data to network 200 and reception of data from network 200 by interface 101. Voice data from microphone 106, after being converted to digital form, is formatted for transmission over network 200 by either interface 101 or computer 102, in accordance with established network protocols. Similarly, data selectively received from the network under control of computer 102 is converted into a digital value in a standardized form, converted to an analog signal by digital to analog converter 103 and reproduced by speaker 105. As generally noted above, in such an arrangement, the computer must either perform or control a plurality of processes such as determining the data packets to be received by the interface 101 from network 200, sending acknowledgements of the same, maintaining system synchronization, resolving contention between requests for service over the network and digital code conversion, as well as call progress and interface connection supervision and responding to transmitted control and status signals.

In the conventional arrangement of FIG. 1, the control computer is often implemented as part of a larger computer system also having access to the distributed network or, more usually, as a dedicated co-processor. As such, the control computer becomes an instrument of the human interface with the network, requiring human intervention via input to the control computer. This requirement of the conventional system requires esoteric and specialized knowledge of the network and the computer control thereof which is inappropriate to and inconsistent with the normal use of a telephone.

Figure 2:
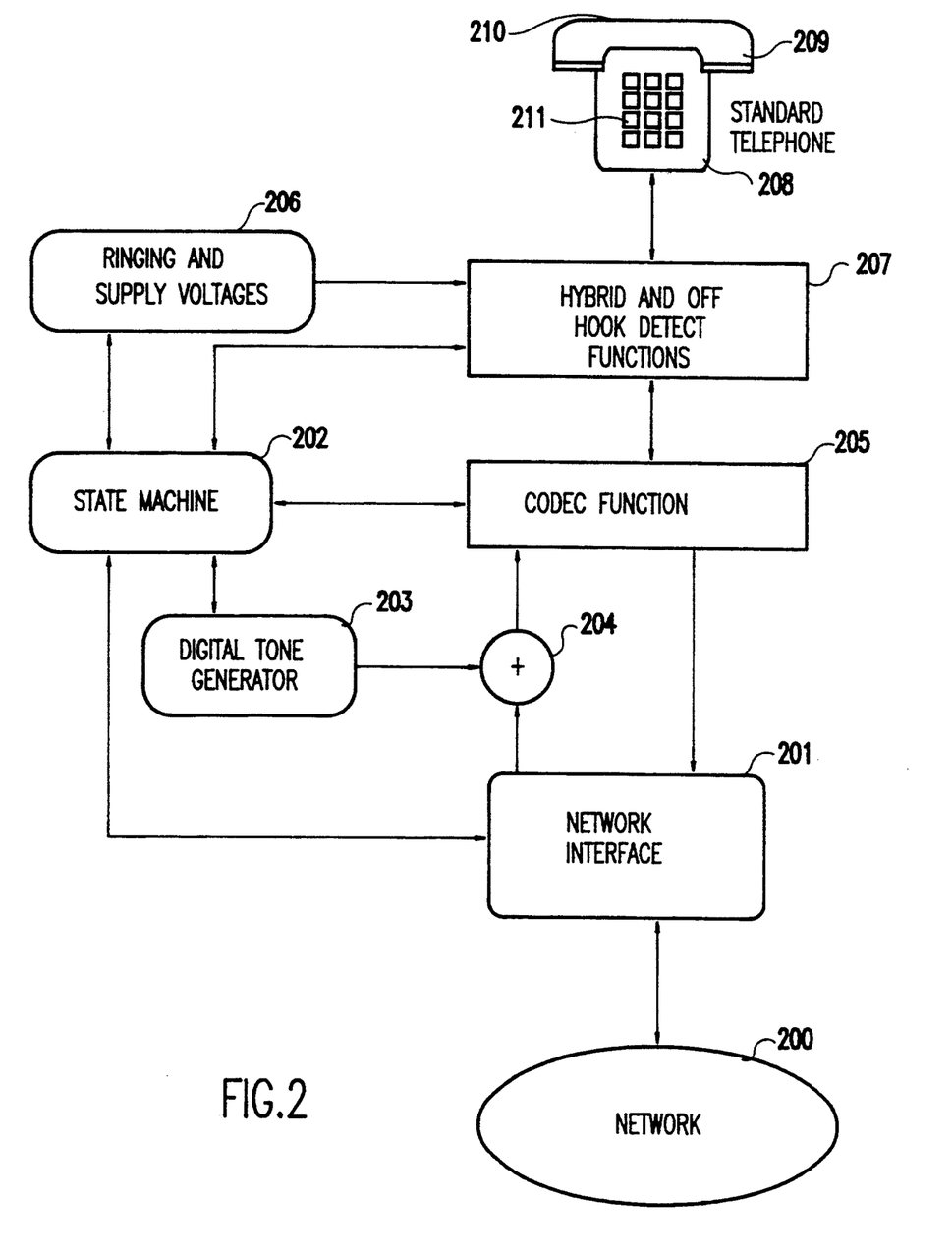
FIG. 2 is a block diagram of the interface of a telephone set to a distributed digital network in accordance with a preferred embodiment of the invention.

In the present invention, as illustrated in block diagram form in FIG. 2, the control of the interface is provided at a higher level of the network while other network functions such as synchronization, contention resolution, and the like are provided at lower layer protocols of the network, as will be discussed below.

According to the invention, a standard telephone set 208 is provided to be interfaced with the network 200 by network interface 201 and will be controlled by some form of a control computer in the same manner. The control computer is not illustrated in FIG. 2 because of the number of forms it may take, including a computer or co-processor which includes the state machine in accordance with the invention. Interface 201 may be the same as interface 101 of FIG. 1. The design of the interface is well understood in the art and the particulars thereof are not necessary to the practice of the invention. It is, however to be understood that the interface 201 is responsive to difference between control packets and data packets, in this case, packets which will be referred to as voice packets to indicate that they are digital data representative of analog signals to be reproduced by the telephone set. Interface 201 of the voice server directs voice packets to coder/decoder 205 and control packets to state machine 202. It is also to be understood that the equipment referred to by the term "standard telephone set" can be any type of equipment which is capable of communicating over telecommunication networks and can include such devices as answering machines, modems, encryption devices and the like. For clarity of description of the invention, however, the telephone set will be assumed to be a device including a handset 209, on-hook switch 210 and a keypad 211, although the invention is equally applicable to corresponding structures in other types of equipment. Hybrid functions (also referred to, in the telecommunications art, as hybrid coil and 2 to 4 wire conversion functions) and off-hook detection functions 207 are provided and are responsive to the on-hook switch 210, the keypad 211 and any other control features, such as a hold call button, which may be included in the telephone set. Ringing and supply voltages 206 are also supplied locally to the telephone set. A coder/decoder 205 is provided to perform not only the analog-to-digital and digital-to-analog conversions of voice data, as in the prior art, but also analog waveform generation under control of digital tone generator 203 in a manner well-understood in the art. The coder/decoder, referred to hereafter as the coder, should also include echo cancellation circuitry for proper operation of the telephone set. However, the echo cancellation function, like the hybrid coil function noted above does not affect the operation of the invention.

It is contemplated that each voice server will contain a voice activated switch for the purpose of detecting voice bursts in a manner similar to that disclosed in "A New Digital Voice-Activated Switch" by J. A. Jankowski, Jr., published in COMSAT Technical Review, Vol. 6, No. 1, Spring 1976, which is also hereby fully incorporated by reference. The use of such a voice activated switch reduces traffic on the network and improves noise immunity of the system by avoiding transmission of non-voice signals in the manner described in this article. Practice of the invention, however, does not rely on the particulars or even the inclusion of such features.

In accordance with the invention, the combination of digital tone generator 203, adder or mixer 204 and coder/decoder 205 can take at least two forms. In one form, digital waveform generation is performed in digital tone generator 203 and mixed with the analog output of the coder/decoder prior to input to element 207. In such a case, the decoded output of the coder/decoder 205, in response to a control signal received from the network or element 207, is input to state machine 202 which controls the digital tone generator to provide corresponding call progress tones (e.g. dial tone, ringing tone, busy tone, call waiting tone, etc.). According to the preferred embodiment of the invention, however, as illustrated, the state machine 202 controls the generation of a code which is mixed with or added to the incoming digital data at element 204 and the analog waveforms corresponding to the progress tones are generated in the coder/decoder in an identical manner, regardless of the source of such control signals. Therefore, it is seen that the preferred embodiment illustrated performs the function of the invention more simply and with a more consistent routing of signals in the interface.

Bidirectional communication is provided between the state machine 202 and each of the ringing and supply source 206, element 207, coder/decoder 205, digital tone generator 203 and interface 201. State machine 202 is typically constituted by a programmed microprocessor to have a predetermined sequence of allowable states, as will be described in detail below for an exemplary embodiment of the invention. In contrast to the conventional arrangement of FIG. 1, even if the state machine is implemented in the same hardware as the control computer, such as a mainframe computer, which controls the local access to the network, it is implemented at a higher level and is responsive to standard telephone control signals as well as call progress signals over the distributed network to provide instructions to the network processor (e.g. control computer, co-processor, etc.) which actually controls the network interface. Therefore the state machine, while, itself, transparent to the user, can render the network processor transparent to the user as well in accordance with the invention.

Figure 3:
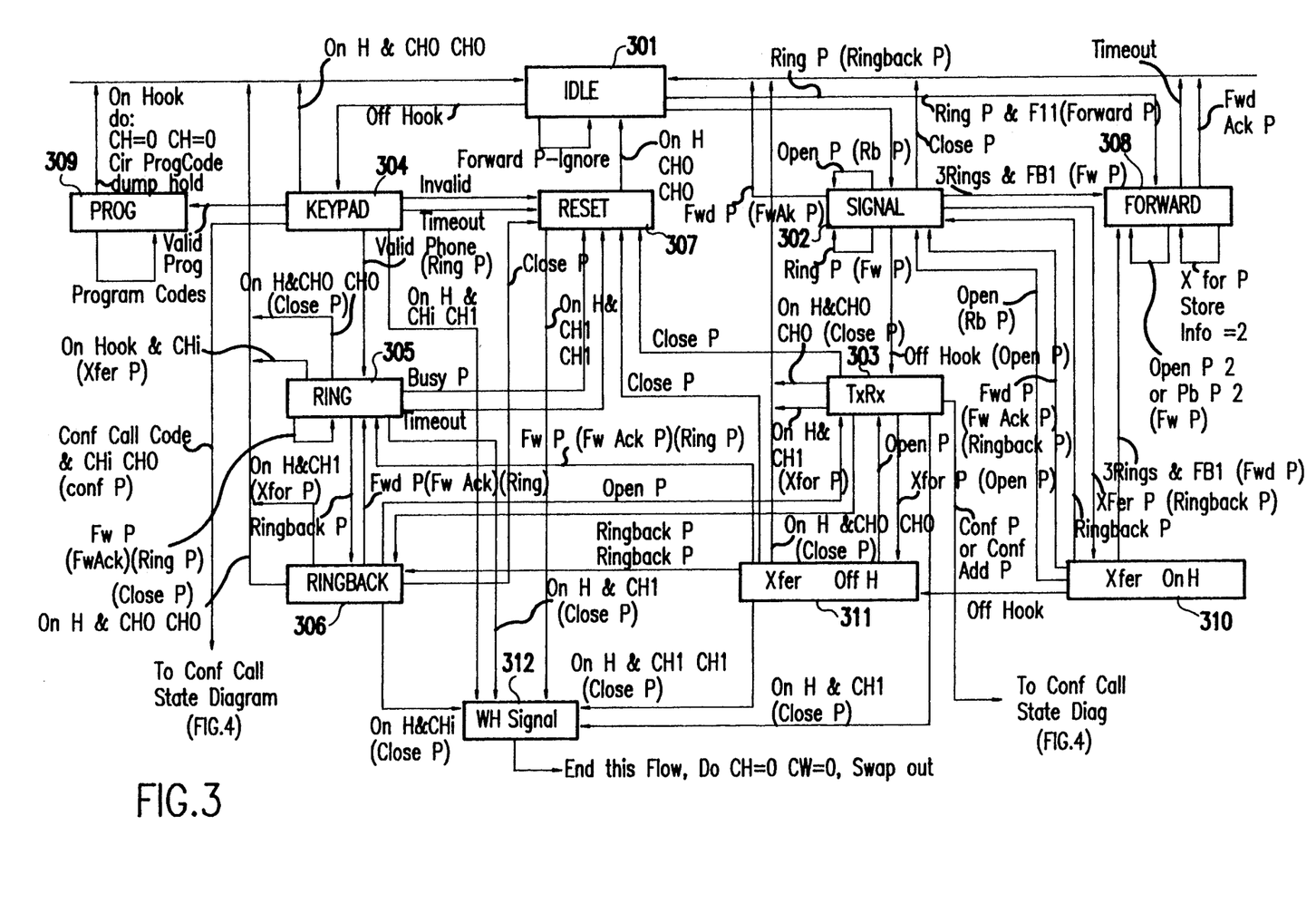
FIG. 3 is a state machine state diagram illustrating the sequence of states of the state machine in accordance with a preferred embodiment of the invention.
Figure 4:
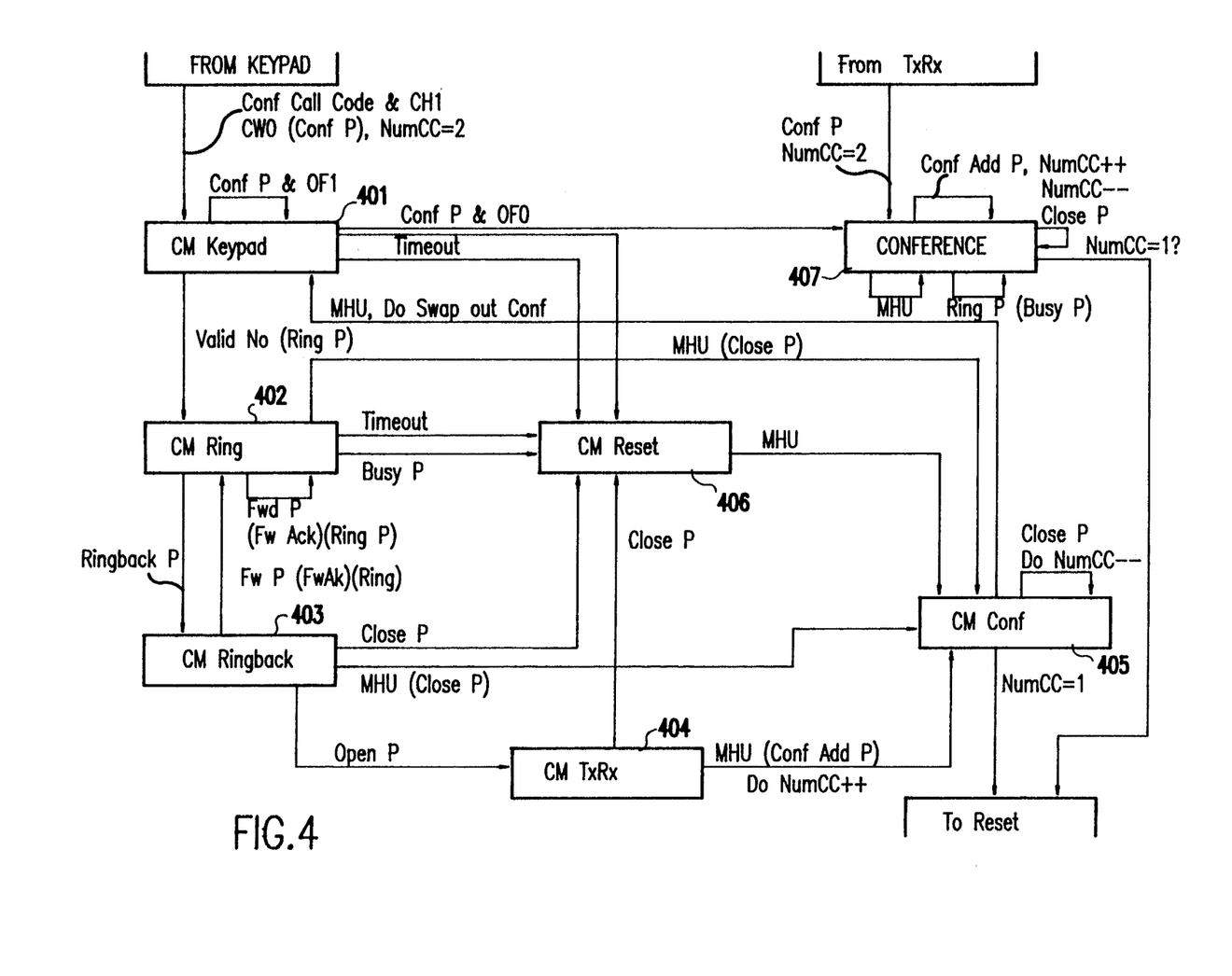
FIG. 4 is a supplementary state machine state diagram illustrating the sequence of states of the state machine in accordance with a preferred embodiment of the invention for the purpose of enabling conference calling.

Referring now to FIGS. 3 and 4, an exemplary sequence of states for which the state machine may be programmed in accordance with the invention will be discussed. As is well-understood in the art, a state machine is a device which can assume one of a plurality of states and be caused to progress from one state to another in a predefined programmed sequence in dependence upon particular prescribed conditions or signals. In its simplest form, a state machine, per se, need be no more than a latch which is toggled in response to a signal. For somewhat more complex functions, as in the present invention, a microprocessor is well-suited for use as a state machine although more complex computing equipment could be used, such as a so-called personal computer or even a mainframe, either of which may or may not be configured to include the network control computer or co-processor. The state machine is programmed to assume a particular state as a function of the current state and a signal or condition input to the state machine. Progress from one particular state to one of a plurality of other states may also be controlled on the basis of one or more input signals or conditions in conjunction with flags which may be set or reset in any previous state. The current state of the state machine is typically indicated by an output signal and used for purposes of control of other apparatus.

State diagrams, such as FIGS. 3 and 4 are well understood and, since the particular state diagrams are merely exemplary of ways in which the state machine can be programmed, most of the possible sequences depicted will not be discussed in detail. However, the state diagrams do represent the preferred embodiment of the invention and are sufficient for one skilled in the art to make and use a state machine in accordance with this preferred embodiment of the invention. Some possible states and sequences are also omitted in the interest of clarity and a representative example given below since they are well understood and not relevant to the practice of the invention and implementation would be readily understood by those skilled in the telecommunications art.

In FIGS. 3 and 4, the following abbreviations are used for conditions indicating a change of state:

name P=packet received
(name P)=packet to be sent
Open P=an "open" command packet
Close P=a "close" command packet
Fw P=Fwd P=Forward packet
Fw Ack=Forward acknowledge P
On H=On hook
Off H=Off hook
Rb P=Ringback P
CH=Call hold
CW=Call wait
FB=Forward Busy/3 rings
FI=Forward immediate
MHU=Momentary hang up
OF=Call originator flag As indicated above, progress from one particular state to one of a plurality of other states may also be controlled on the basis of one or more input signals or conditions in conjunction with flags which may be set or in any previous state. These flags monitor conditions concerning the communication on the network regardless of the state of the state machine. Typical flags used which are indicated in FIG. 3 include:

1.) CC (Conference)—A conference call has been initiated.
2.) OF (Originator flag)—Indicates conference master if there is a conflict during a conference call.
3.) NumCC (Number of conferees)—A location in memory indicating the number of conferees in a conference call.
4.) FB (forward busy/3 rings)—This flag is set when the call forward feature is activated and the called telephone set is off-hook or on-hook after a predetermined number of rings.
5.) Hook—This flag indicates the on or off hook state of the telephone set and possibly as a variable for momentary hang up. This flag is used to capture an off hook condition if a user goes off-hook while in the Forward state. Other flags which correspond to well known conditions and are self-explanatory are:

6.) CH—call hold
7.) CW—call waiting
8.) FI—forward immediate
9.) FF—forwarded flag (e.g. prevents more than one level of forwarding)
10.) GTF—generating tone flag
11.) NRP—no receive packet
12.) SMF—secure mode flag
13.) PSM—poll secure mode (never set if CC flag is set)
14.) SMR—secure mode received In FIG. 3, the respective states of the state machine are defined as follows:

1.) Idle—The voice server is in idle state 301 if there is no incoming or outgoing call established or being attempted.
2.) Signal—The signal state 302 is reached when a call has been received, a ringback packet has been sent to the calling telephone set, and the telephone set corresponding to the state machine is ringing.
3.) TxRx—The TxRx (Transmit/Receive) state 303 is reached when a connection has been established and voice packets are being sent and received.
4.) Keypad—The keypad state 304 is reached from idle state 301 upon detection of an off-hook signal. In this state, the processor (e.g. the network control computer) is expecting numbers from the local keypad in order to accumulate an address on the network to call (which, incidentally, can be an interface to equipment off the network such as a commercial telecommunications network), to accumulate or enter a program code or program a feature, such as call forwarding, conference calling, local number change, etc. Upon detecting an off-hook condition a Feature Calling function is preferably provided to determine if the telephone set is in the Forward state before entering the keypad state. However, it is sufficient to the practice of the invention to merely progress from the idle state to the keypad state in response to detection of an off-hook condition.
5.) Ring—In the ring state 305, the voice server is attempting to establish a connection; a ring packet has been sent and the voice server is waiting for a ringback packet.
6.) Ringback—In the ringback state 306, the voice server continues attempting to establish a connection. A ringback packet has been received, a ringback tone is being played out to the user and the voice server is waiting for and "open" packet.
7.) Reset—The reset state 307 is entered on busy, close P, timeout or an error condition and off-hook. This state is maintained until an on-hook condition is detected, which causes the idle state to be entered. This latter state change brings all software and hardware to a known initial state and is important in maintaining user transparency, according to the invention since it causes the interface to perform in a manner consistent with normal (e.g. commercial) network usage.
8.) Forward—The forward state 308 is entered when call forwarding of an incoming call has previously been commanded and the call forwarding conditions (e.g. 3 rings) have been met. A forward packet is sent upon entering this state and the state is maintained until a forward acknowledge packet is received or timeout. The idle state 301 is then entered. If a user goes off-hook in the forward state, the idle state 301 must be reached before a dial tone is granted on proceeding to the keypad state 304.
9.) Program—The program state 309 is entered when a program code is entered from the keypad. This state allows the voice server to be locally programmed from a telephone set.
10.) Xfer on H—The Xfer on-hook state 310 (Transfer on-hook) is entered from the signal state 302 when a transfer packet is received. This state is maintained until communication is established with a new party or until the telephone set goes off-hook. A timer is started upon entering this state and a ringback packet is sent on timeout. This ringback packet is the same as the previous packet which was sent to the calling station and informs the new party of the state of this station. The Xfer on hold state 310 is exited on acknowledgement of this ringback packet indicating the state of the new party telephone set. If the local telephone set goes off hook in this state, the Xfer off hook state is entered.
11. Xfer off M—The Xfer off H state 311 (Transfer off hook) is entered as indicted above or from TxRx state 303 when a transfer packet is received. This state is maintained until communication is established with the new party. A timer is also started on entering this state and an open packet is sent on timeout.
12. WH Signal—The WH Signal state 312 (wait/hold signal) is entered to remind the user of a call waiting or on hold when an on-hook condition is detected by causing the telephone set to ring when the momentary hang up period expires. When an off-hook condition is again detected, the waiting or held call becomes the current call and the WH Signal state 312 is canceled as indicated by the legend "swap out" in FIG. 3.

Of the above, idle, Xfer on H, Signal, Forward and WH Signal are on-hook states. Keypad, Program, Reset, Ring, Ringback, TxRx and Xfer off H are off-hook states.

Some conditions are not shown on the state diagram since they do not involve a change of state. As an example, if the telephone set is off-hook when a ring packet is received and the forwarding flags FB and FI are 0, a beep tone is periodically generated, the call waiting flag, CW, is set to 1 and the ring packet information is stored. This example is given to indicate that the present invention can provide full transparency of the distributed digital network to the user and that full emulation of normal network functions is provided for.

Referring now to FIG. 4, states and paths of the state machine additional to those illustrated in FIG. 3 are illustrated which are necessary to establish conference calls over the distributed digital network. It should be noted in this regard that conference calling is only one of many features which can be provided in a fashion in which the distributed digital network is entirely transparent to the user. Therefore, the following discussion of this feature should be considered as exemplary of the manner in which any feature which is or can be made available on a standard telephone set can also be made available over a distributed digital network. It is also important to note that these other features, as may be from time to time deemed desirable, can be provided in software without any dedicated structure being required at any point in the system. While memory locations (e.g. in the microprocessor or memory), which need not be dedicated, may be required, as in this conference call feature example, for the purpose of holding flag information, these may also be established by software.

In the following discussion, it is important to recognize that there are two ways in which a telephone set and interface may be placed into a conference call mode. The first is to dial the conference call code. If successful, this operation will establish that telephone set as the conference master for the duration of the conference call. The second is for the local voice server to receive a conference call packet from another voice server which is trying to establish a conference call.

Conference calling preferably disables all feature calling except call forward busy. If other features are provided, selected feature calling may be enabled or disabled as may be appropriate to that feature in a similar fashion.

According to the preferred embodiment of the invention, the following states are additionally provided in the state machine:

1.) CM Keypad—The CM Keypad state 401 (Conference Master Keypad) is entered from keypad state 304 for FIG. 3 when a conference call code is input. Flags are set to disable all feature calling other than call forward busy on entering this state.

2.) CM Ring—The CM Ring state 402 (Conference Master Ring) is entered from CM Keypad state 401 when a valid address on the network is input. Upon entry onto this state, a ring packet is sent and the interface waits for a ringback packet. Momentary hang up causes change to the CM Conf state. Ring packets are answered with busy packets in this state. Also, in this state, Forward packets are answered with forward acknowledge packets and a ring packet to the new address.

3.) CM Ringback—The CM ringback state 403 (Conference Master Ringback) is entered upon receipt of a ringback packet by the conference master voice server. An "open" packet is awaited in a manner similar to ringback state 306 of FIG. 3.

4.) CM TxRx—The CM TxRx state 404 is analogous to the TxRx state 303 of FIG. 3 and is used for talking to a party before adding that party to the conference call by momentary hang up. A close packet can be sent to the conference master by that party, should entry into the conference call not be desired, by that party going on-hook.

5.) CM Conference—The CM Conference state 405 (Conference Master Conference) is entered from the CM Ringback state on momentary hang up and is maintained throughout the conference call. A momentary hang up causes change of state to CM Keypad and is used to add parties to the conference at any point during the conference. If a close packet is received by the conference master in this state, the conference list is changed (NumCC is decremented). If an on-hook detection is made at the conference master voice server, close packets are sent to all other voice servers in the conference. Under this circumstance, the conference may continue but since no conference master remains, no new parties can be added to the conference.

6.) CM Reset—The CM Reset state 406 (Conference master Reset) has the same function as Reset state 307 in FIG. 3. As in that state, a disconnection or an error condition as well as on-hook and momentary hang ups from selected other conference master states cause this state to be assumed and maintained until another on-hook condition or momentary hang up is detected.

7. Conference—The Conference state 407 is entered on receipt of a conference packet from the conference master. In this state, there will also be local processing of entries to and departures from the conference. This state is left when on-hook condition is detected or when NumCC equals 1 (there are no other parties to the conference call).

Figure 7:
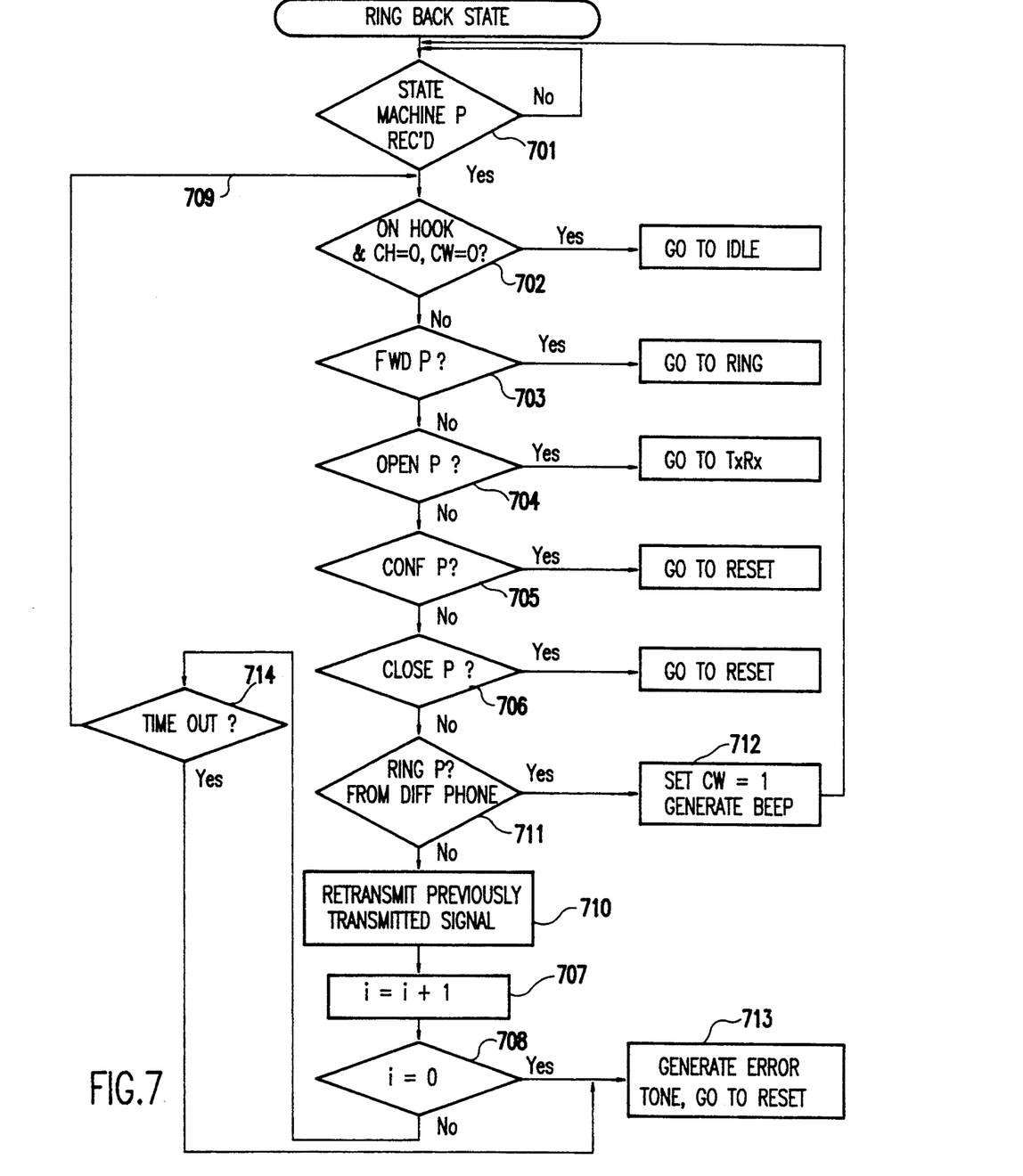
FIG. 7 is a flow chart illustrating a feature of the invention state machine by which error tolerance of the invention is increased.

An important feature of this invention, an of which will be discussed with reference to FIG. 7, is the call progress monitoring which increases the error tolerance of the voice server and system of the invention to the distributed digital network. In any given state illustrated in FIGS. 3 and 4, the state machine is only responsive to selected possible status or control signals, referred to collectively as state machine signals for proceeding to a particular permitted next state. However, the state machine receives and evaluates 701 all such signals received from the distributed network by the interface 201 as indicated above. If a state machine signal is received which does not correspond to a permitted next state from a given voice server when the local voice server is in any given state, the state machine causes the last state machine signal which was transmitted to that given voice server to be retransmitted 710. This may be done a single time or a plurality of times 707, 708, 709 as may be advantageous in particular states if an acknowledgement of the retransmitted state machine signal is not received. If an acknowledgement is received, the communication link will have been resumed. If no acknowledgement is received after a predetermined period or lapse of time, an error condition will be generated, as a last resort, to restore the communication link.

As a specific example, assume that the state machine is in the Ringback state 306 where a ringback signal has been received, the telephone set is playing out a ringback tone and the state machine is awaiting an "open" packet to complete the establishment of a communication link. From this state, the state machine would, of course, respond to the detection 704 of an "open" packet by proceeding to the TxRx state. The state machine would also properly respond to the detection 702 of an on-hook condition with both the CW and CH flag equal to zero to resume the idle state. The state machine would also validly respond to the receipt 706 of a close packet signal to assume the reset state and to a Forward packet 703 by assuming the ring state. Detection of a close packet 706 would indicate that a called voice server wished to terminate the connection and, while possibly an error since the communication link has not been fully established, would cause the state machine to assume the Reset state without generation of an error tone. All of these operations are shown in FIG. 3. Also a ring packet received 711 in this state would cause the setting of the CW flag and generation of a beep tone 712. Other packets of state machine signals received, such as a ringback packet, a busy packet, a forward or forward acknowledge packet or a transfer packet from the called voice server would cause retransmission 710 of the previous state machine signal, presuming that signal to have produced an erroneous signal in accordance with an erroneous state which was, in turn, entered because of a network fault. In most cases, the retransmission will cause the correct state to be resumed after one or more attempts 707. If the correct state is not resumed within a predetermined time 714 or number of retransmissions 708, an error signal is generated and the state machine will assume the reset state until an on-hook condition is detected. Of course, it is also advantageous in some circumstances, as illustrated in this example, to provide for immediate error condition generation. In this case, this is provided if a conference or conference add packet is received 705 by the calling state machine. This circumstance is particularly egregious since any response by the calling voice server to the called voice server would result in ambiguity as to the current state since conference calls can only be validly entered from the TxRx state. The desired response 713, therefore, is to generate an error tone and go directly to reset, breaking the connection.

It is to be understood that the flow chart is exemplary of not only the state monitoring function which is provided in each state, but also of the monitoring which is to be provided at the Ringback state itself. For instance, variations in the order of detection of signals packets is generally not critical. Similarly, variations in count, timing and the loop reentry points can be varied to produce advantageous variations in the monitoring function. It may be useful, however, to specifically provide for at least all possible state machine packets, in the manner illustrated for packets 703–706, rather than by a default as illustrated at the output of 711, since such detections can then be logged during debugging operations of the system.

In a similar fashion, it is possible for the state machine to provide error checking on the voice data to invoke a transmission protocol of increased reliability and generation of error conditions to increase reliability of the communication link over the distributed digital network. This is particularly desirable when encryption of data is utilized. In practice, however, for non-encrypted communications, this has been found to be unnecessary since the above status monitoring arrangement is tolerant of faults far in excess of the rates assured by normal fault recovery techniques usually present on the digital network. The above arrangement has even been found to be tolerant of disconnections from the network for periods of several seconds without the communication link being lost. As for the integrity of the voice data itself, no further provision for error recovery has been found to be necessary beyond suppression of bad data. Even packets received in an erroneous order are simply played out with degradation of the resulting audio signal so slight as to seldom be audible.

In regard to the possibility of encryption, however, one advantage of the voice communication system according to the present invention is that standard digital encryption techniques can be employed since the voice signals are transmitted digitally from the voice server. Encryption can be also be performed at numerous other levels including bulk encryption of the network and encryption at or at the input of the individual voice server, such as by using encrypting telephone sets. If encryption is utilized at the voice server level, it is important to also use a transmission protocol which guarantees delivery of each packet so that encryption synchronization is not lost. This is in contrast to the operation of the invention under non-encrypted signal conditions which exploits the information redundancy in voice patterns to permit ignoring or discarding of voice packets under certain conditions, such as for simplifying conference calling, as disclosed in the concurrently filed Steagall et al application, which is hereby incorporated by reference.

Figure 5:
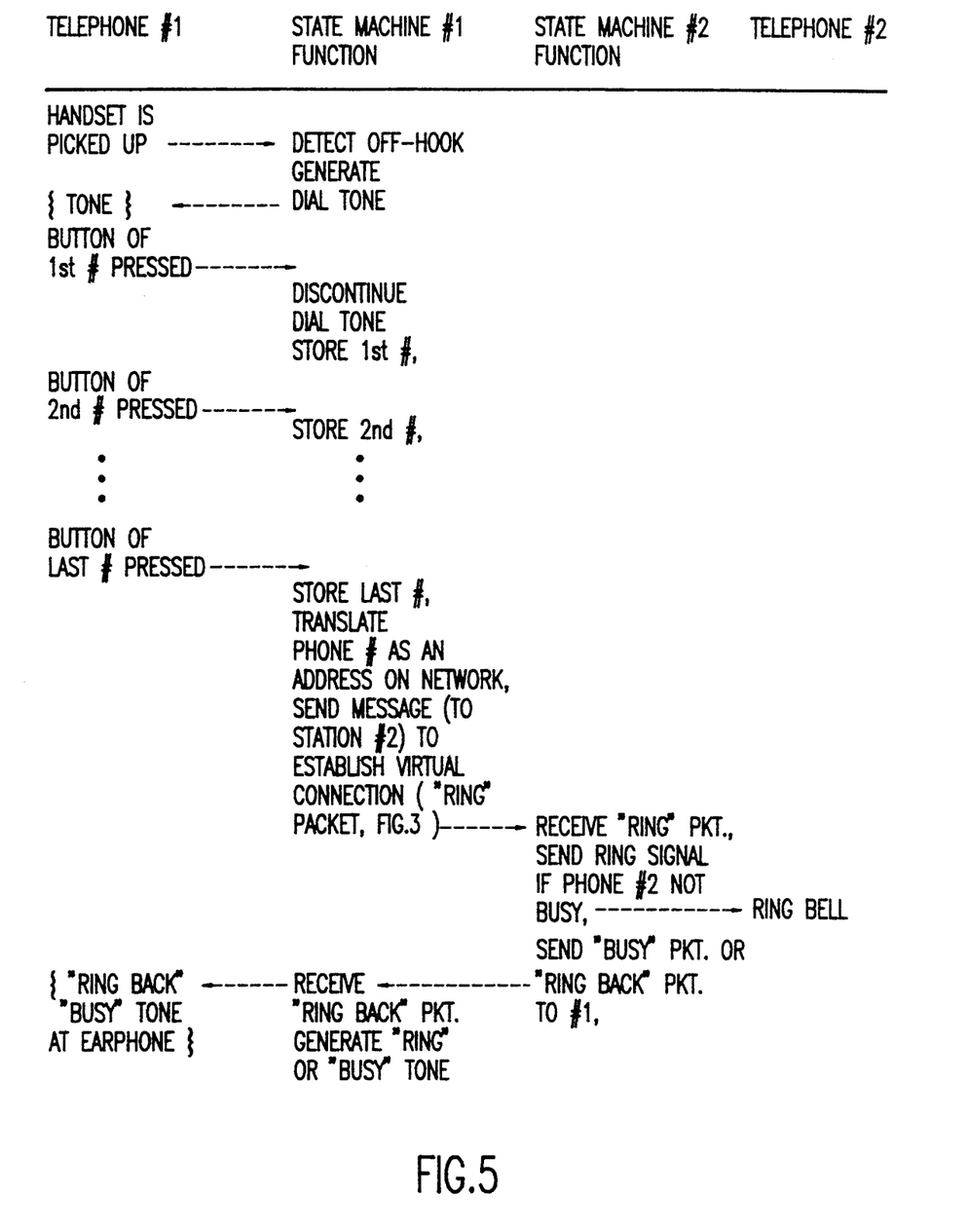
FIGS. 5 and 6, together, are an illustration of an exemplary operation of the system in accordance with the invention.

Now, with reference to FIGS. 5 and 6, the operation of the system for a simple call will be described. This description is given as an example only and more complex scenarios may be followed from the state diagrams of FIG. 3 in a similar fashion.

Presuming a user at station #1 wishes to place a call to station #2 over a distributed digital network in accordance with the invention. Picking up the handset of the standard telephone set at station #1 is detected by the off-hook detector of element 207, illustrated in FIG. 2. This detection causes the state machine #1 to exit the Idle state 301 and to assume the Keypad state 304. Entry of the Keypad state 304 causes the state machine to issue a code or some other signal which causes digital tone generator 203 to generate either a waveform as noted above, or, preferably a signal calling for a particular analog signal to be generated by coder 205. While this analog signal will typically be a signal corresponding to a progress tone, in this case, a dial tone, it is to be understood that any analog signal including voice synthesis could be provided within the scope of this invention. This latter feature may be useful to provide audible prompts (e.g. "Please dial a sequence of seven numbers"), information concerning features available on the network, programmed greetings, instructions for use of the system or features, etc.

In response to the dial tone or other prompt, the user will dial a digit or press a key of the keypad corresponding to the first number representing a first digit of the address of station #2. The dial tone will be terminated and the first digit will be stored. This is repeated an appropriate number of times. During each key depression of the keypad, the standard telephone set will generate and play out to the handset a series of pulses or a tone such as tones of the Dual-Tone Multiple-Frequency scheme currently in widespread use. When a predetermined number of digits has been stored and a valid address has been assembled and recognized, the state machine leaves the keypad state 304 and enters the ring state.

In the ring state 305, ring packet containing an address of station #2 is sent over the distributed digital network. When the ring packet is received by station #2, it is acknowledged by station #2 by sending a ringback packet or a busy packet in dependence on the on or off hook condition of the associated telephone set when the state machine of station #2 enters the Signal state 302. The state machine of station #2 also causes the associated telephone set to begin ringing if it is on hook.

Receipt of the ringback or busy packet by station #1 causes state machine #1 to enter the ringback state in response to which state machine #1 controls local generation of an analog signal such as a ringing or busy tone, respectively, in the same manner as the dial tone discussed above, which is communicated to the user by the earpiece of the telephone handset 209.

When telephone set #2 goes off-hook, state machine #2 assumes the TxRx state and sends an "open" packet to station #1. Receipt of the open packet by station #1 causes it to also assume the TxRx state.

Note also at this point that if the open packet is not received by station #1, periodic status signal which may be sent between stations to allow detection of incompatible states which will cause retransmission of previously transmitted state machine signals by either or both stations since they will be in incompatible states. Similarly, if the open packet is garbled, lack of acknowledgement of an open packet by station #1 will prompt a retransmission of an open packet by station #2 and the communication link will be established. In either process, the communication link will be established (or the initial conditions reset and the communication link thereafter established) without user intervention with respect to the distributed digital network. The above-described process will be entirely transparent to the user since telephone set #1 will continue to produce a dial tone until a key of the keypad is depressed and then terminated until the communication link is established, as would be expected in a call over a commercial network using a central station. While a short silence may be experienced at telephone set #2, the first audible signal produced at telephone set #2 will be a voice response from station #1 to the voice communication from station #2.

Figure 6:
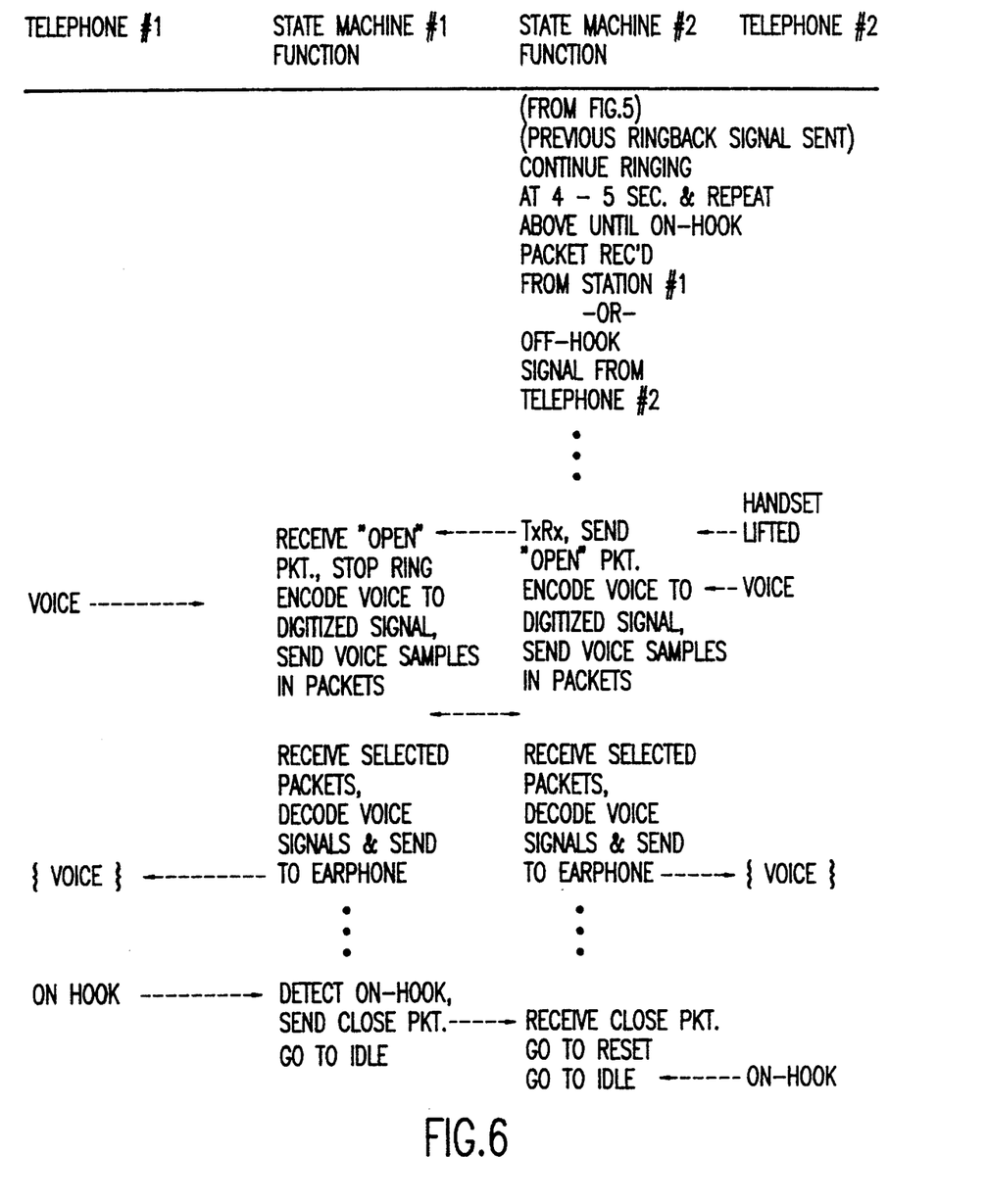

With reference to FIG. 6, the (non-conference) voice communication will continue in a fully bidirectional fashion with voice being encoded into digital voice packets, voice packets being transmitted, received and decoded and the decoded analog signals being played out (e.g. acoustically reproduced) until an on-hook condition is detected. If, for instance, an on-hook condition is detected at station #1, a close packet is sent and the Idle state is entered. In response to the close packet, state machine #2 will assume the reset state until station #2 goes on-hook and then assume the Idle state. If, on the other hand, the on-hook condition is detected at station #2, a close packet will be similarly sent and state machine #2 merely goes to the Idle state.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. Apparatus for connection between a standard telephone set and an interface to a distributed digital communication network, said interface being responsive to digital signals from said apparatus for initiating and controlling progress of a call communication on said network, said apparatus comprising:
   a state machine responsive to at least off-hook and keypad signals from said standard telephone set and digital control signals from said interface representing a progress state of said call communication,
   a codec having a signal converter means for converting digital signals from said interface to analog signals reproducible by said standard telephone set and converting analog voice signals from said standard telephone set to digital signals for transmission to said interface,
   digital tone code generating means responsive to said state machine for generating digital codes representing at least one of said keypad signal and said off-hook signal from said standard telephone set, and
   means for inputting said digital codes from said digital tone code generating means to said codec, including means for combining said digital codes from said digital tone code generating means with said digital signals from said interface, for conversion to analog signals
   whereby call progress tones representing at least one of said off-hook signal and said keypad signals from said standard telephone set are locally generated independently of said distributed digital communication network or said interface to said distributed digital communication network.

2. Apparatus as recited in claim 1, wherein said means for combining comprises
   means for mixing said digital tone codes with said digital codes from said interface.

3. Apparatus as recited in claim 1, wherein
   said state machine is controlled to change state in response to digital signals from said interface, and wherein
   said tone code generating means further includes means for generating digital tone codes representing at least one of a ringing tone and a busy signal in response to states of said state machine under control of said interface.

4. Apparatus as recited in claim 3, wherein at least one state of said state machine is responsive to a condition of another standard telephone set connected to said distributed digital network.

5. Apparatus as recited in claim 3, wherein at least one state of said state machine represents an error condition communicated from said distributed digital network.

6. Apparatus as recited in claim 1, wherein at least one of said state machine and said tone code generating means includes means for controlling ringing of said at standard telephone set.

7. Apparatus as recited in claim 1, wherein said state machine further includes
   means for storing a plurality of said keypad signals, and
   means for translating said plurality of keypad signals to an address.

* * * * *